United States Patent
Chuang et al.

(10) Patent No.: US 11,772,649 B2
(45) Date of Patent: Oct. 3, 2023

(54) IN-CAR SAFETY SYSTEM AND OPERATING METHOD THEREOF

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Suzhou (CN); General Interface Solution Limited, Miaoli County (TW)

(72) Inventors: Sheng-Chun Chuang, Guangdong (CN); Chia-Chen Yeh, Guangdong (CN); Ching-Hao Liao, Guangdong (CN)

(73) Assignees: Interface Technology (ChengDu) Co., Ltd., Sichuan (TW); Interface Optoelectronics (ShenZhen) Co., Ltd., Guangdong (CN); Optoelectronics (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 197 days.

(21) Appl. No.: 17/446,988

(22) Filed: Sep. 7, 2021

(65) Prior Publication Data
US 2023/0028242 A1    Jan. 26, 2023

(30) Foreign Application Priority Data

Jul. 21, 2021    (CN) .......................... 202110824364.1

(51) Int. Cl.
*B60W 30/12*    (2020.01)
*B60Q 9/00*    (2006.01)
(Continued)

(52) U.S. Cl.
CPC ............... *B60W 30/12* (2013.01); *B60Q 9/00* (2013.01); *B60W 30/095* (2013.01);
(Continued)

(58) Field of Classification Search
CPC ....... B60Q 9/00; B60W 30/095; B60W 30/12; B60W 50/16; B60W 2420/42; B60W 2420/52; B60W 2420/62; B60W 2422/70
(Continued)

(56) References Cited

U.S. PATENT DOCUMENTS

| | | | |
|---|---|---|---|
| 2006/0180371 A1* | 8/2006 | Breed | G07C 5/008 180/197 |
| 2006/0212193 A1* | 9/2006 | Breed | B60C 23/0425 701/33.7 |

(Continued)

FOREIGN PATENT DOCUMENTS

| | | | | |
|---|---|---|---|---|
| AU | 2013256573 B2 * | 12/2015 | ............... | B60Q 9/00 |
| KR | 20190031700 A * | 3/2019 | ............ | B60W 50/16 |

(Continued)

*Primary Examiner* — Atul Trivedi
(74) *Attorney, Agent, or Firm* — CKC & Partners Co., LLC (57) ABSTRACT

An in-car safety system includes: a detecting device, a processor, an in-car equipment and a piezoelectric device. The detecting device is disposed on a car. The processor is disposed in the car. The processor is electrically connected to the detecting device. The processor is configured to receive a detecting signal transmitted by the detecting device and transmit an electrical signal in accordance with the detecting signal. The in-car equipment is disposed in the car. The piezoelectric device is disposed on the in-car equipment. The piezoelectric device is electrically connected to the processor. The piezoelectric device is configured to receive the electrical signal and generate a vibration to the in-car equipment in accordance with the electrical signal.

20 Claims, 6 Drawing Sheets

(51) Int. Cl.
　　　*B60W 30/095*　　　(2012.01)
　　　*B60W 50/16*　　　(2020.01)

(52) U.S. Cl.
　　　CPC ......... *B60W 50/16* (2013.01); *B60W 2420/42* (2013.01); *B60W 2420/52* (2013.01); *B60W 2420/62* (2013.01); *B60W 2422/70* (2013.01)

(58) Field of Classification Search
　　　USPC .......................................................... 701/45
　　　See application file for complete search history.

(56) References Cited

U.S. PATENT DOCUMENTS

| | | | | |
|---|---|---|---|---|
| 2007/0126561 A1* | 6/2007 | Breed | ................ | B60R 25/2081 |
| | | | | 340/426.13 |
| 2007/0139216 A1* | 6/2007 | Breed | .................... | G08C 17/00 |
| | | | | 340/13.24 |
| 2007/0156312 A1* | 7/2007 | Breed | ................. | B60C 23/0408 |
| | | | | 701/31.4 |
| 2007/0156320 A1* | 7/2007 | Breed | ................. | B60C 23/0433 |
| | | | | 701/70 |
| 2007/0276582 A1* | 11/2007 | Coughlin | .............. | B60W 50/16 |
| | | | | 701/123 |
| 2008/0065290 A1* | 3/2008 | Breed | .................... | G01L 17/00 |
| | | | | 701/31.4 |
| 2008/0216567 A1* | 9/2008 | Breed | ................... | B60R 21/013 |
| | | | | 73/146.5 |
| 2014/0293053 A1* | 10/2014 | Chuang | ................ | B60K 28/066 |
| | | | | 348/148 |
| 2016/0107570 A1* | 4/2016 | Modarres | ............ | B62D 15/029 |
| | | | | 340/435 |
| 2016/0318442 A1* | 11/2016 | James | ..................... | B60N 2/04 |
| 2017/0021762 A1* | 1/2017 | Daman | .................... | B60Q 9/00 |
| 2018/0253094 A1* | 9/2018 | Chang | .................. | G05D 1/0055 |
| 2021/0157312 A1* | 5/2021 | Cella | ................... | G01M 13/045 |
| 2022/0388524 A1* | 12/2022 | Roberts | ................... | G01S 13/04 |

FOREIGN PATENT DOCUMENTS

| | | | | |
|---|---|---|---|---|
| WO | WO-2004091956 A2 * | 10/2004 | ............ | A63F 13/00 |
| WO | WO-2022259227 A1 * | 12/2022 | | |

\* cited by examiner

IN-CAR SAFETY SYSTEM AND OPERATING METHOD THEREOF

RELATED APPLICATION

This application claims priority to China Application Serial Number 202110824364.1, filed Jul. 21, 2021, which is herein incorporated by reference in its entirety.

BACKGROUND

Field of Invention

The present disclosure relates to an in-car safety system and an operating method of the in-car safety system.

Description of Related Art

In general, a warning system of a car usually uses a display to show a warning image to remind a driver to pay attention to driving conditions. However, if the driver does not pay attention to the display when the car is moving, or when the display shows the warning image but the driver does not see the warning image in time, the driver cannot immediately receive the warning, which may cause accidents while the driver is operating the car.

SUMMARY

An aspect of the present disclosure is related to an in-car safety system.

According to an embodiment of the present disclosure, an in-car safety system includes: a detecting device, a processor, an in-car equipment and a piezoelectric device. The detecting device is disposed on a car. The processor is disposed in the car. The processor is electrically connected to the detecting device. The processor is configured to receive a detecting signal transmitted by the detecting device and transmit an electrical signal in accordance with the detecting signal. The in-car equipment is disposed in the car. The piezoelectric device is disposed on the in-car equipment. The piezoelectric device is electrically connected to the processor. The piezoelectric device is configured to receive the electrical signal and generate a vibration to the in-car equipment in accordance with the electrical signal.

In an embodiment of the present disclosure, the in-car equipment is a steering wheel having a vibration area, the detecting signal includes a position information of the detecting device, and the position information corresponds to a position of the vibration area of the steering wheel.

In an embodiment of the present disclosure, the processor is configured to receive the position information such that the piezoelectric device generates a vibration on the vibration area of the steering wheel.

In an embodiment of the present disclosure, the processor is configured to control the vibration generated by the piezoelectric device such that the vibration has different vibrating frequencies, intensities, or time.

In an embodiment of the present disclosure, the detecting device is a tire pressure detecting device disposed on a tire of the car, and the detecting signal includes a tire pressure information of the tire pressure detecting device.

In an embodiment of the present disclosure, the in-car equipment is a steering wheel having a vibration area, and the tire pressure information corresponds to a position of the vibration area of the steering wheel.

In an embodiment of the present disclosure, the processor is configured to receive the tire pressure information such that the piezoelectric device generates the vibration on the vibration area of the steering wheel.

In an embodiment of the present disclosure, the in-car equipment is a seat belt, and the piezoelectric device is disposed on a surface of the seat belt.

In an embodiment of the present disclosure, the in-car equipment is a seat or a gear lever, and the piezoelectric device is disposed on a surface of the seat or on a surface of the gear lever.

In an embodiment of the present disclosure, the detecting device is a light detecting and ranging (LIDAR) device, the LIDAR device is disposed around the car, and the LIDAR device is configured to detect a distance between the car and an obstacle by utilization of a laser light.

In an embodiment of the present disclosure, the detecting device is a camera, the camera is disposed on a periphery of the car, and the detecting signal includes a distance between the car and two sides of a lane detected by the camera.

In an embodiment of the present disclosure, the in-car safety system of claim 1 further includes a turn signal. The turn signal is electrically connected to the processor. The turn signal is configured to provide turning information.

In an embodiment of the present disclosure, the in-car equipment is a steering wheel having a vibration area, and a position of the vibration area corresponds to the turning information of the turn signal.

In an embodiment of the present disclosure, the processor is configured to receive the turning information such that the piezoelectric device generates the vibration on the vibration area of the steering wheel.

In an embodiment of the present disclosure, the piezoelectric device has a first electrode, a second electrode and a piezoelectric body, and the piezoelectric body is located between the first electrode and the second electrode.

In an embodiment of the present disclosure, the piezoelectric device is a piezoelectric single crystal, piezoelectric polycrystal, piezoelectric ceramic, piezoelectric polymer or piezoelectric composite material.

An aspect of the present disclosure is related to an operating method of an in-car safety system.

According to an embodiment of the present disclosure, an operating method of an in-car safety system includes: transmitting a detecting signal to a processor, wherein the detecting signal is generated by a detecting device, and the detecting device is disposed on a car; analyzing the detecting signal by the processor, wherein the processor is disposed in the car, and the processor is electrically connected to the detecting device; transmitting an electrical signal to a piezoelectric device by the processor according to the detecting signal, wherein the piezoelectric device is disposed on an in-car equipment, and the piezoelectric device is electrically connected to the processor; and generating a vibration to the in-car equipment by the piezoelectric device according to the electrical signal.

In an embodiment of the present disclosure, the in-car equipment is a steering wheel having a vibration area, and transmitting the detecting signal to the processor includes transmitting a tire pressure information, a position information of the detecting device and a distance between the car and two sides of a lane.

In an embodiment of the present disclosure, the method further includes transmitting turning information to the processor by a turn signal, wherein the turn signal is electrically connected to the processor.

In an embodiment of the present disclosure, generating the vibration to the in-car equipment by the piezoelectric device according to the electrical signal includes: receiving the electrical signal by a first electrode and a second electrode of the piezoelectric device such that a piezoelectric body of the piezoelectric device generates the vibration.

In the aforementioned embodiments of the present disclosure, the piezoelectric device of the in-car safety system may perform an inverse piezoelectric effect based on the electrical signal of the processor to generate the vibration to the in-car equipment of the in-car safety system to transmit safety warnings to a driver. For example, the driver may directly contact the in-car equipment, and when the piezoelectric device vibrates on the in-car equipment, the driver may receive the safety warnings and determine a course of action for a situation outside the car by sensing the vibration in time. In this way, when the driver's gaze is not on a display of the car, the vibration generated by the piezoelectric device may allow the driver to receive the safety warnings in time such that the driver does not need to focus on the display to prevent car accidents.

BRIEF DESCRIPTION OF THE DRAWINGS

FIG. 4A to FIG. 8B illustrate a schematic view of operating the in-car safety system of FIG. 1.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
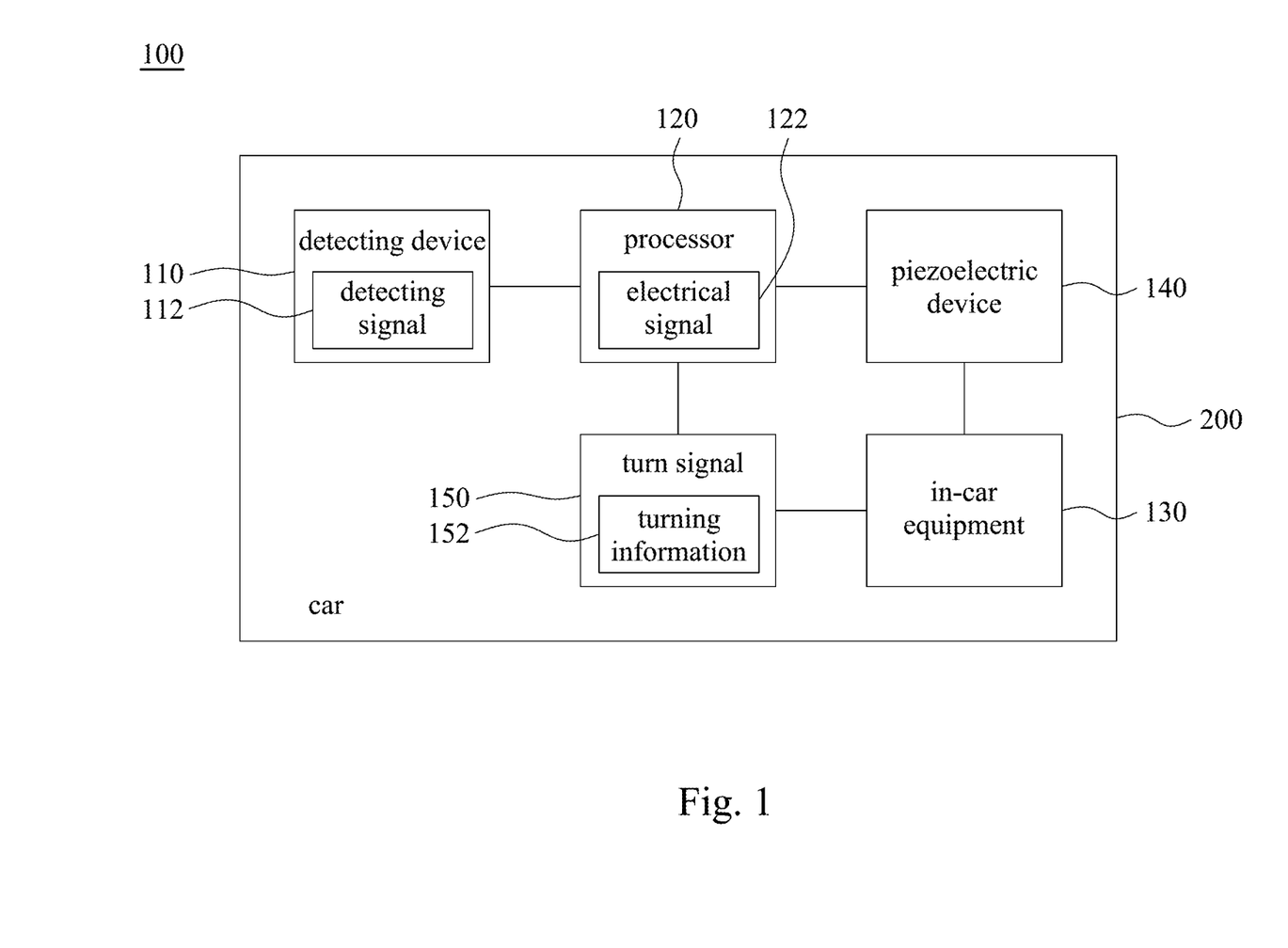
FIG. 1 illustrates a block view of an in-car safety system according to one embodiment of the present disclosure.

FIG. 1 illustrates a block view of an in-car safety system 100 according to one embodiment of the present disclosure. Referring to FIG. 1, the in-car safety system 100 includes a detecting device 110, a processor 120, an in-car equipment 130 and a piezoelectric device 140. The detecting device 110 of the in-car safety system 100 is disposed on a car 200, and the processor 120 and the in-car equipment 130 are disposed in the car 200. The processor 120 is configured to receive a detecting signal 112 transmitted by the detecting device 110 and configured to transmit an electrical signal 122 to the piezoelectric device 140 according to the detecting signal 112. In addition, the processor 120 is electrically connected to the detecting device 110 and the piezoelectric device 140. The piezoelectric device 140 is disposed on the in-car equipment 130. The piezoelectric device 140 may generate an inverse piezoelectric effect according to the received electrical signal 122 to generate a vibration to the in-car equipment 130.

Specifically, the piezoelectric device 140 of the in-car safety system 100 may perform the inverse piezoelectric effect based on the electrical signal 122 of the processor 120 to generate the vibration to the in-car equipment 130 of the in-car safety system 100 to transmit safety warnings to a driver. For example, the driver of the car 200 may directly contact the in-car equipment 130, and when the piezoelectric device 140 vibrates on the in-car equipment 130, the driver may receive the safety warnings and determine a course of action for a situation outside the car 200 by sensing the vibration in time. In this way, when the driver's gaze is not on a display of the car 200, the vibration generated by the piezoelectric device 140 may allow the driver to receive the safety warnings in time such that the driver does not need to focus on the display to prevent car accidents.

Figure 2A:
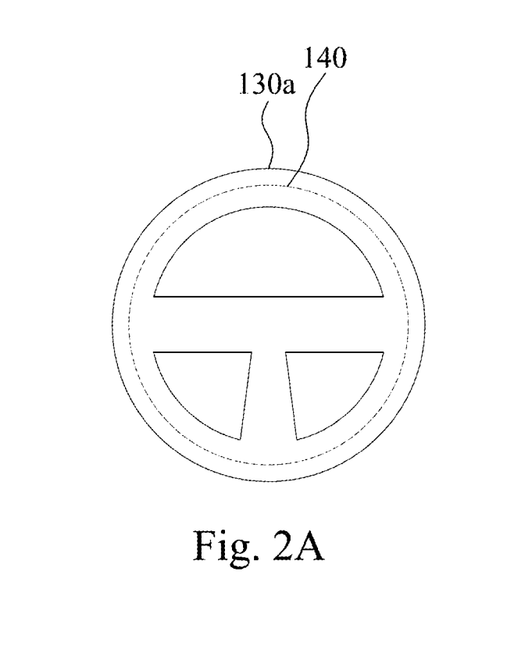
FIG. 2A, FIG. 2B and FIG. 2C illustrate a schematic view of an in-car equipment of the in-car safety system of FIG. 1.
Figure 2B:
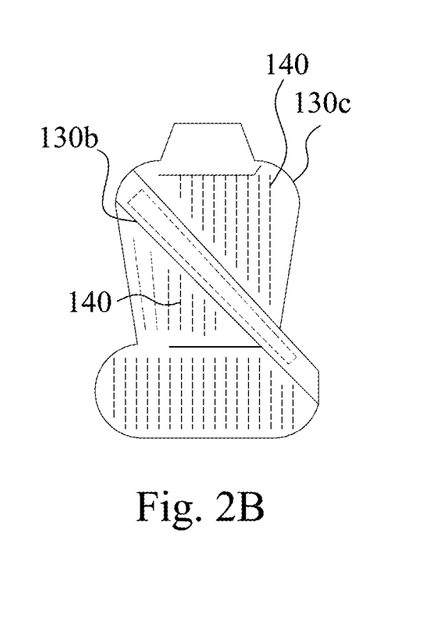
Figure 2C:
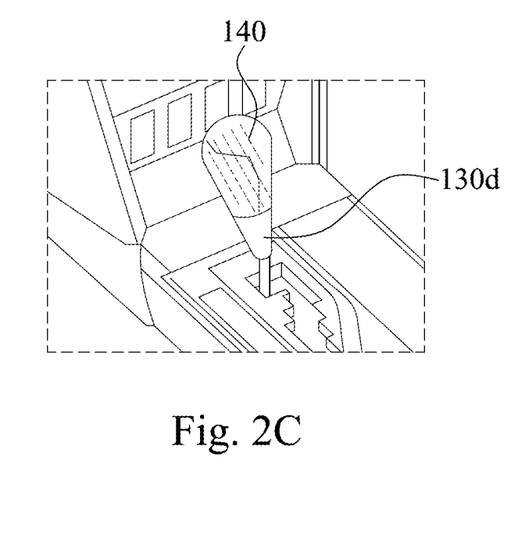

FIG. 2A, FIG. 2B and FIG. 2C illustrate a schematic view of the in-car equipment 130 of the in-car safety system 100 of FIG. 1. In one embodiment, the in-car equipment 130 of the in-car safety system 100 of FIG. 1 may be a steering wheel 130a of FIG. 2A, a seat belt 130b of FIG. 2B, a seat 130c of FIG. 2B or a gear lever 130d of FIG. 2C. Referring to both FIG. 1 and FIG. 2A, the piezoelectric device 140 may be disposed in the steering wheel 130a. When the driver of the car 200 holds the steering wheel 130a, the in-car safety system 100 may use the piezoelectric device 140 to generate the vibration on the steering wheel 130a to transmit the safety warnings to the driver. Referring to both FIG. 2B and FIG. 2C, the piezoelectric device 140 may be disposed on surfaces of the seat belt 130b, the seat 130c and the gear lever 130d, and the safety warnings are transmitted to the driver by the vibration generated by the piezoelectric device 140.

Figure 3:
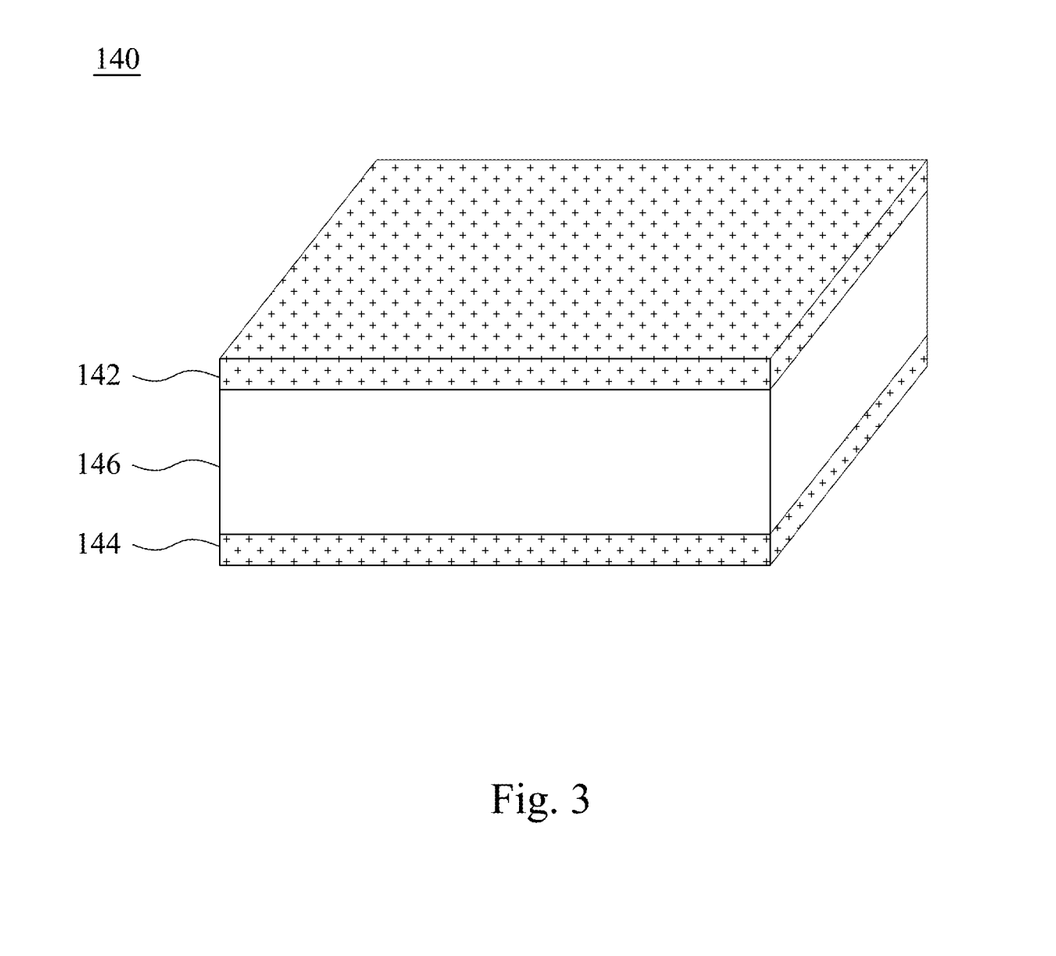
FIG. 3 illustrates a stereoscopic view of a piezoelectric device of the in-car safety system of FIG. 1.

FIG. 3 illustrates a stereoscopic view of the piezoelectric device 140 of the in-car safety system 100 of FIG. 1. Referring to both FIG. 1 and FIG. 3, the piezoelectric device 140 of the in-car safety system 100 has a first electrode 142, a second electrode 144 and a piezoelectric body 146. The piezoelectric body 146 of the piezoelectric device 140 is located between the first electrode 142 and the second electrode 144. After the detecting device 110 transmits the detecting signal 112 to the processor 120, and the processor 120 transmits the electrical signal 122 to the first electrode 142 and the second electrode 144 of the piezoelectric device 140 according to the detecting signal 112, the piezoelectric body 146 of the piezoelectric device 140 may perform the inverse piezoelectric effect to generate the vibration. In one embodiment, the electrical signal 122 transmitted by the processor 120 may be a current sufficient to cause the piezoelectric body 146 of the piezoelectric device 140 to generate required vibration intensities. In addition, the processor 120 of the in-car safety system 100 may control the vibration generated by the piezoelectric device 140 by controlling the electrical signal 122 such that the vibration has different vibration frequencies, vibration intensities, or vibration time to express different levels of criticality and different car conditions. For example, the piezoelectric device 140 of the in-car safety system 100 generates the vibrations in different degrees, which means that when an obstacle 300 (see FIG. 4A) is in front of the car 200 (see FIG. 4A) in the same car condition, different vibration frequencies, intensities and time are used to distinguish a distance difference between the car 200 and the obstacle 300. The piezoelectric device 140 of the in-car safety system 100 generates the vibration in different car conditions, which means tire pressure is abnormal, the obstacle 300 (see FIG. 6A) is located in the way of a turning direction or the car 200 deviates from a lane. The piezoelectric device 140 of the in-car safety system 100 may be a piezoelectric single crystal, piezoelectric polycrystal, piezoelectric ceramic, piezoelectric polymer or piezoelectric composite material.

Figure 4A:
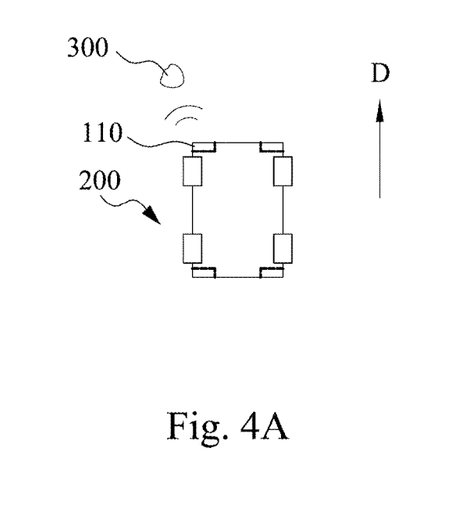
Figure 4B:
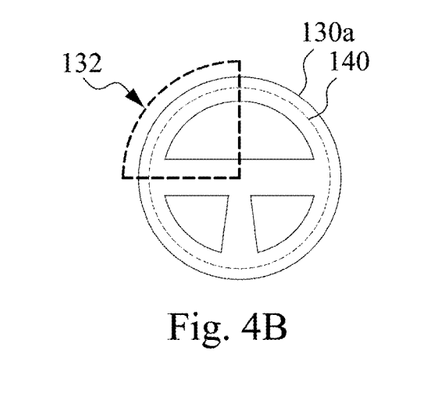

FIG. 4A to FIG. 8B illustrate a schematic view of operating the in-car safety system 100 of FIG. 1. Referring to FIG. 1, FIG. 4A and FIG. 4B, the in-car equipment 130 of the in-car safety system 100 may be the steering wheel 130a with a vibration area 132, and the detecting device 110 may be a light detection and ranging (LIDAR) device. The LIDAR device 110 is disposed around the car 200. The LIDAR device 110 is configured to measure a distance between the car 200 and the obstacle 300 by utilization of a laser light. The detecting signal 112 of the LIDAR device 110 may include position information of the LIDAR device 110. In addition, the position information of the LIDAR device 110 (for example, an upper left direction) corresponds to a position (for example, an upper left portion) of the vibration area 132 of the steering wheel 130a. For example, when the car 200 moves in a direction D and the LIDAR device 110 detects the obstacle 300 in the left front of the car 200, the LIDAR device 110 may send the detecting signal 112 including the position information to the processor 120. After the processor 120 receives the position information, it may cause the piezoelectric device 140 to perform the inverse piezoelectric effect and vibrate on the vibration area 132 on the upper left portion of the steering wheel 130a such that an effect of partitioned vibration is achieved, and the driver may notice the obstacle 300.

Figure 5A:
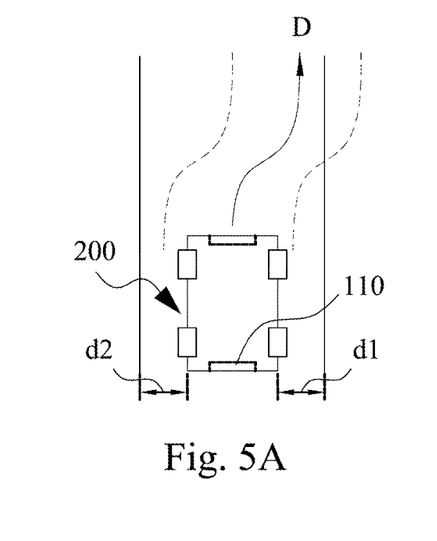
Figure 5B:
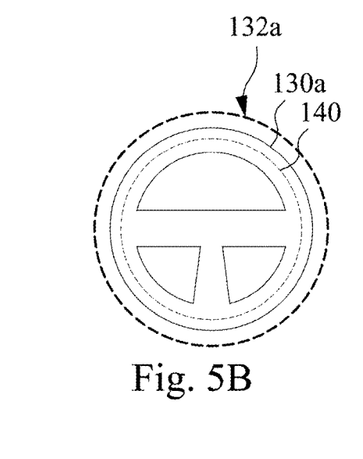

Referring to FIG. 1, FIG. 5A and FIG. 5B, the detecting device 110 of the in-car safety system 100 may be a camera. The camera 110 may be disposed on a periphery of the car 200, and the detecting signal 112 may include distances d1 and d2 between the car 200 and two sides of the lane. For example, when the car 200 moves in the direction D (that is, the car 200 is deviated) and the camera 110 detects that the distance d1 and d2 are changed (for example, the distance d1 becomes larger and the distance d2 becomes smaller), the camera 110 transmits the detecting signal 112 to the processor 120, and the processor 120 transmits the electrical signal 122 according to the detection signal 112, so that the piezoelectric device 140 may perform the inverse piezoelectric effect on a vibration area 132a of the steering wheel 130a and send the safety warnings to the driver of the car 200.

Figure 6A:
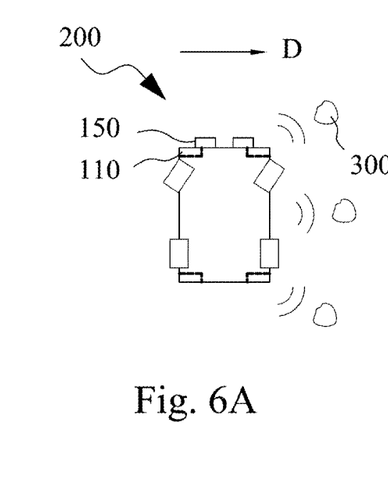
Figure 6B:
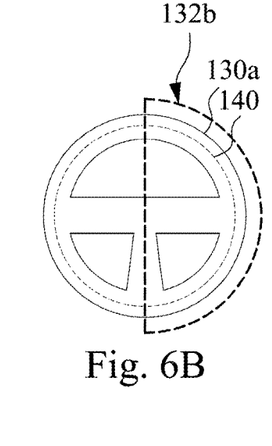

Referring to FIG. 1, FIG. 6A and FIG. 6B, the in-car safety system 100 further includes a turn signal 150. The turn signal 150 is electrically connected to the processor 120, and the turn signal 150 is configured to transmit turning information 152 to the processor 120. The in-car equipment 130 of the in-car safety system 100 may be the steering wheel 130a with a vibration area 132b, and a position of the vibration area 132b (for example, a right side) corresponds to the turning information 152 (for example, turn right) of the turn signal 150. For example, when the driver wants to turn right to activate the turn signal 150, the turn signal 150 may send the turning information 152 to the processor 120.

In addition, when the detecting device 110 detects that the obstacle 300 is in the way of the direction D, the detecting device 110 may send the detecting signal 112 to the processor 120. After the processor 120 receives the turning information 152 and the detecting signal 112, the piezoelectric device 140 may perform an inverse piezoelectric effect on the vibration area 132b of the steering wheel 130a and send the safety warnings to the driving of the car 200 such that the driver may notice the obstacle 300.

Figure 7A:
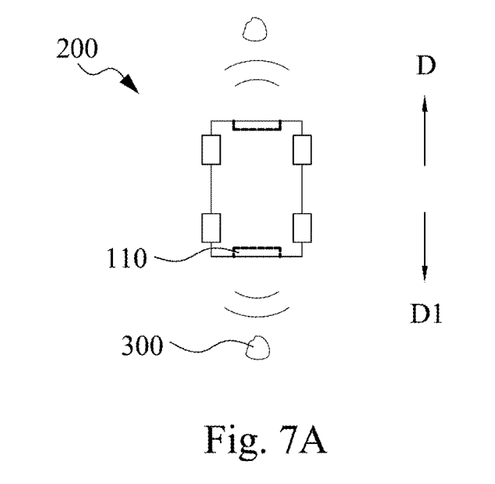
Figure 7B:
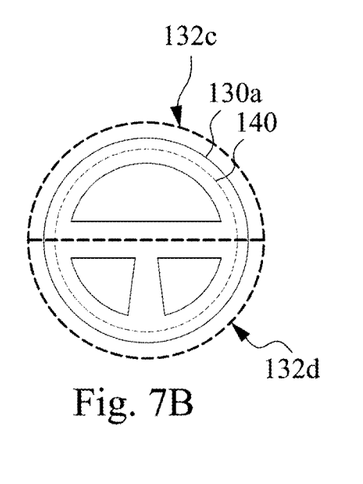

Referring to FIG. 1, FIG. 7A and FIG. 7B, the in-car equipment 130 of the in-car safety system 100 may be the steering wheel 130a with two vibration areas 132c and 132d, and the two vibration areas 132c and 132d are symmetrically arranged. For example, when the gear lever 130d of FIG. 2C moves to a forward gear, the car 200 moves in the direction D and the detecting device 110 detects the obstacle 300 in the direction D, the processor 120 may cause the piezoelectric device 140 to vibrate on the vibration area 132c of the steering wheel 130a to alert the driver. Similarly, when the gear lever 130d of FIG. 2C is moved to a reverse gear, the car 200 moves in the direction D1 and the detecting device 110 detects the obstacle 300 is located in the way of the direction D1, the processor 120 may cause the piezoelectric device 140 to vibrate on the vibration area 132d of the steering wheel 130a to alert the driver.

Figure 8A:
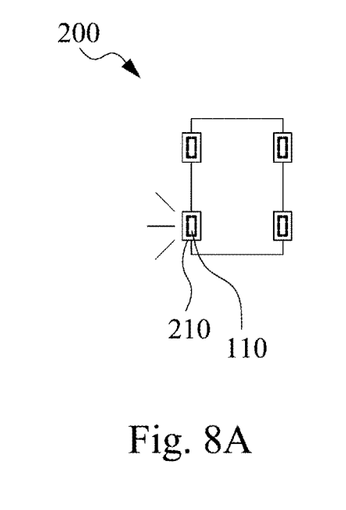
Figure 8B:
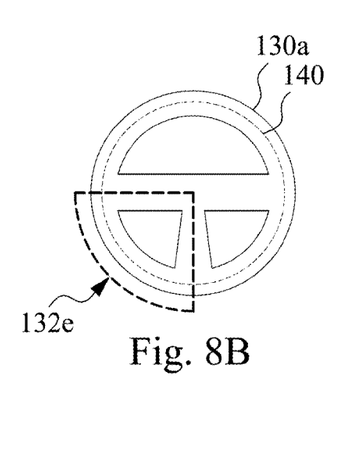

Referring to FIG. 1, FIG. 8A and FIG. 8B, the detecting device 110 of the in-car safety system 100 may be a tire pressure detecting device disposed on a tire 210 of the car 200, and the detecting signal 112 may include tire pressure information of the tire pressure detecting device 110. The in-car equipment 130 of the in-car safety system 100 may be the steering wheel 130a with a vibration area 132e, and the tire pressure information of the tire pressure detecting device 110 (for example, lower left direction) corresponds to a position of the vibration area 132e of the steering wheel 130a (for example, lower left direction). For example, when the tire pressure detecting device 110 detects that the tire pressure of the tire 210 is abnormal, the tire pressure information may be sent to the processor 120 so that the piezoelectric device 140 may vibrate on the vibration area 132e of the steering wheel 130a to alert the driver.

It is to be noted that the connection relationship of the aforementioned elements will not be repeated. In the following description, an operating method of an in-car safety system will be described.

Figure 9:
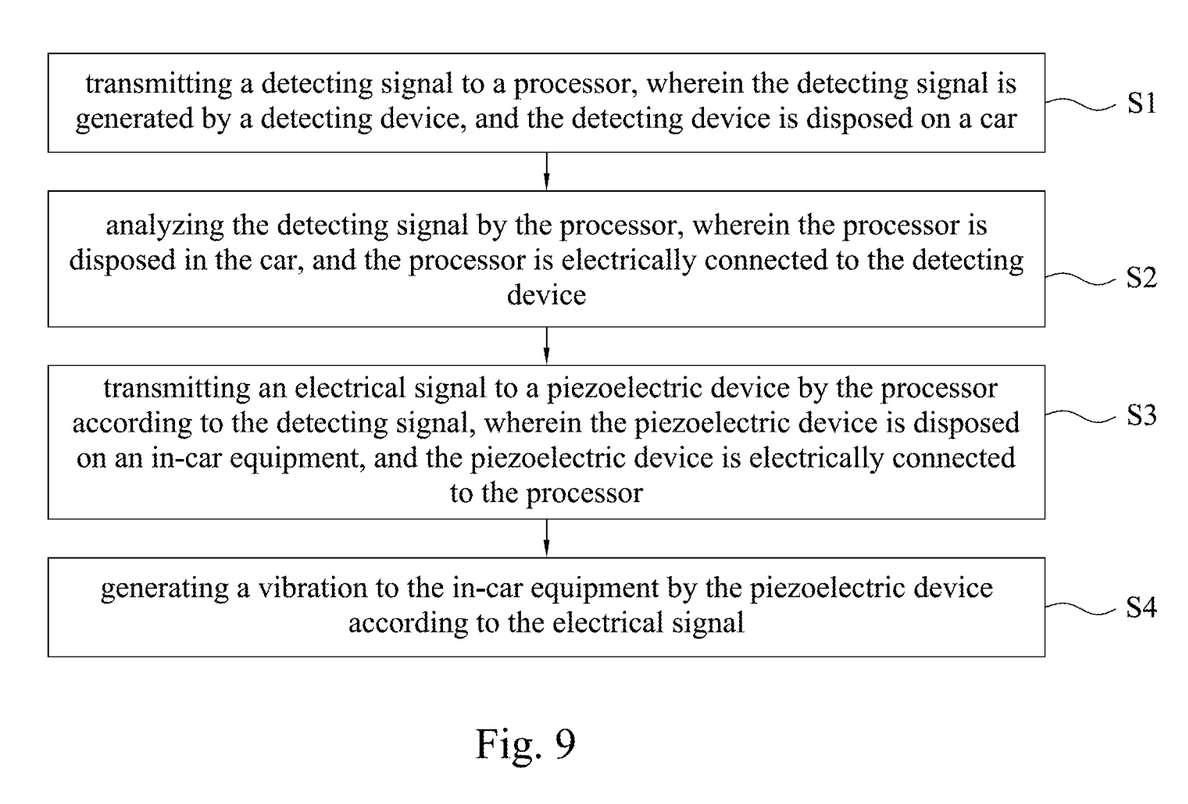
FIG. 9 illustrates a flow chart of an operating method of an in-car safety system according to one embodiment of the present disclosure.

FIG. 9 illustrates a flow chart of an operating method of an in-car safety system according to one embodiment of the present disclosure. The operating method of the in-car safety system includes steps as outlined below. In step S1, a detecting signal is transmitted to a processor, wherein the detecting signal is generated by a detecting device, and the detecting device is disposed on a car. In step S2, the detecting signal is analyzed by the processor, wherein the processor is disposed in the car, and the processor is electrically connected to the detecting device. In step S3, an electrical signal is transmitted to a piezoelectric device by the processor according to the detecting signal, wherein the piezoelectric device is disposed on an in-car equipment, and the piezoelectric device is electrically connected to the processor. In step S4, a vibration is generated to the in-car equipment by the piezoelectric device according to the electrical signal. In the following description, the aforementioned steps will be described in detail.

Referring to FIG. 1 and FIG. 9, in step S1, the detecting signal 112 is transmitted to the processor 120. The detecting signal 112 is generated by the detecting device 110, and the detecting device 1110 is disposed on the car 200. In addition, transmitting the detecting signal 112 to the processor 120 includes transmitting the tire pressure information of the tire pressure detecting device, the position information of the detecting device 110 and the distances d1, d2 between the car 200 and the two sides of the lane (see FIG. 5A). In step S2, the detecting signal 112 is analyzed by the processor 120. The processor 120 is disposed in the car 200, and the processor 120 is electrically connected to the detecting device 110.

In step S3, the electrical signal 122 is transmitted to the piezoelectric device 140 by the processor 120 according to the detecting signal 112. The piezoelectric device 140 is disposed on the in-car equipment 130, and the piezoelectric device 140 is electrically connected to the processor 120. The in-car equipment 130 may be the steering wheel 130a (see FIG. 4B) with the vibration area 132 (see FIG. 4B). In step S4, the vibration is generated to the in-car equipment 130 by the piezoelectric device 140 according to the electrical signal 122. The method further includes transmitting the turning information 152 to the processor 120 through the turn signal 150. The turn signal 150 is electrically connected to the processor 120.

Referring to both FIG. 1 and FIG. 3, in one embodiment, generating the vibration to the in-car equipment 130 by the piezoelectric device 140 according to the electrical signal 122 includes receiving the electrical signal 122 by the first electrode 142 and the second electrode 144 of the piezoelectric device 140 such that the piezoelectric body 146 of the piezoelectric device 140 performs the inverse piezoelectric effect to generate the vibration. The electrical signal 122 transmitted by the processor 120 may be a current sufficient to cause the piezoelectric body 146 of the piezoelectric device 140 to generate a desired vibration intensity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An in-car safety system, comprising:
    a detecting device disposed on a car and configured to generate and transmit a detecting signal when the detecting device detects a change in relative distances of the car with respect to a first reference and a second reference, wherein the first reference and the second reference are on two opposing sides of the car, and the detecting signal is in correlation with the change in the relative distances;
    a processor disposed in the car and electrically connected to the detecting device, wherein the processor is configured to receive the detecting signal transmitted by the detecting device and transmit an electrical signal in accordance with the detecting signal;
    an in-car equipment disposed in the car; and
    a piezoelectric device disposed on the in-car equipment and electrically connected to the processor, wherein the piezoelectric device is configured to receive the electrical signal and generate a vibration to the in-car equipment in accordance with the electrical signal.

2. The in-car safety system of claim 1, wherein the in-car equipment is a steering wheel having a vibration area, the detecting signal comprises a position information of the detecting device, and the position information corresponds to a position of the vibration area of the steering wheel.

3. The in-car safety system of claim 2, wherein the processor is configured to receive the position information such that the piezoelectric device generates the vibration on the vibration area of the steering wheel.

4. The in-car safety system of claim 1, wherein the processor is configured to control the vibration generated by the piezoelectric device such that the vibration has different vibrating frequencies, intensities, or time.

5. The in-car safety system of claim 1, wherein the detecting device is a tire pressure detecting device disposed on a tire of the car, and the detecting signal comprises a tire pressure information of the tire pressure detecting device.

6. The in-car safety system of claim 5, wherein the in-car equipment is a steering wheel having a vibration area, and the tire pressure information corresponds to a position of the vibration area of the steering wheel.

7. The in-car safety system of claim 6, wherein the processor is configured to receive the tire pressure information such that the piezoelectric device generates the vibration on the vibration area of the steering wheel.

8. The in-car safety system of claim 1, wherein the in-car equipment is a seat belt, and the piezoelectric device is disposed on a surface of the seat belt.

9. The in-car safety system of claim 1, wherein the in-car equipment is a seat or a gear lever, and the piezoelectric device is disposed on a surface of the seat or on a surface of the gear lever.

10. The in-car safety system of claim 1, wherein the detecting device is a light detecting and ranging (LIDAR) device, the LIDAR device is disposed around the car, and the LIDAR device is configured to detect a distance between the car and an obstacle by utilization of a laser light.

11. The in-car safety system of claim 1, wherein the detecting device is a camera, the camera is disposed on a periphery of the car, and the detecting signal comprises a distance between the car and two sides of a lane detected by the camera.

12. The in-car safety system of claim 1, further comprising:
    a turn signal being electrically connected to the processor, wherein the turn signal is configured to provide a turning information.

13. The in-car safety system of claim 12, wherein the in-car equipment is a steering wheel having a vibration area, and a position of the vibration area corresponds to the turning information of the turn signal.

14. The in-car safety system of claim 13, wherein the processor is configured to receive the turning information such that the piezoelectric device generates the vibration on the vibration area of the steering wheel.

15. The in-car safety system of claim 1, wherein the piezoelectric device has a first electrode, a second electrode and a piezoelectric body, and the piezoelectric body is located between the first electrode and the second electrode.

16. The in-car safety system of claim 1, wherein the piezoelectric device is a piezoelectric single crystal, piezoelectric polycrystal, piezoelectric ceramic, piezoelectric polymer or piezoelectric composite material.

17. An operating method of an in-car safety system, comprising:
    transmitting a detecting signal by a detecting device to a processor when the detecting device detects a change in relative distances of a car with respect to a first reference and a second reference,
wherein the detecting device is disposed on the car, the processor is disposed in the car, the processor is electrically connected to the detecting device, the first reference and the second reference are on two opposing sides of the car, and the detecting signal is in correlation with the change in the relative distances;
transmitting an electrical signal to a piezoelectric device by the processor according to the detecting signal, wherein the piezoelectric device is disposed on an in-car equipment, and the piezoelectric device is electrically connected to the processor; and
generating a vibration to the in-car equipment by the piezoelectric device according to the electrical signal.

18. The operating method of the in-car safety system of claim 17, wherein the in-car equipment is a steering wheel having a vibration area, and transmitting the detecting signal to the processor comprises transmitting a tire pressure information, a position information of the detecting device and a distance between the car and two sides of a lane.

19. The operating method of the in-car safety system of claim 17, further comprising:
transmitting a turning information to the processor by a turn signal, wherein the turn signal is electrically connected to the processor.

20. The operating method of the in-car safety system of claim 17, wherein generating the vibration to the in-car equipment by the piezoelectric device according to the electrical signal comprises:
receiving the electrical signal by a first electrode and a second electrode of the piezoelectric device such that a piezoelectric body of the piezoelectric device generates the vibration.

* * * * *

UNITED STATES PATENT AND TRADEMARK OFFICE
CERTIFICATE OF CORRECTION

PATENT NO. : 11,772,649 B2
APPLICATION NO. : 17/446988
DATED : October 3, 2023
INVENTOR(S) : Sheng-Chun Chuang, Chia-Chen Yeh and Ching-Hao Liao It is certified that error appears in the above-identified patent and that said Letters Patent is hereby corrected as shown below:

On the Title Page

Item (71) the Applicants should read as "Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)" rather than "Interface Technology (ChengDu)Co., Ltd., Sichuan(CN); Interface Optoelectronics (ShenZhen) Co., Ltd., Guangdong (CN); Interface Optoelectronics (Wuxi) Co., Ltd., Suzhou (CN); General Interface Solution Limited, Miaoli County(TW)".

Item (73) the Assignees should read as "Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)" rather than "Interface Technology (ChengDu) Co., Ltd., Sichuan(TW); Interface Optoelectronics (ShenZhen) Co., Ltd., Guangdong (CN); Optoelectronics (Wuxi) Co., Ltd., Jiangsu(CN); General Interface Solution Limited, Miaoli County(TW)".

Signed and Sealed this
Twelfth Day of December, 2023

Katherine Kelly Vidal
*Director of the United States Patent and Trademark Office*